O. FRANKMAN.
CONVEYER FOR BEET HARVESTERS AND THE LIKE.
APPLICATION FILED MAR. 27, 1916.

1,205,089.

Patented Nov. 14, 1916.

O. Frankman, Inventor

UNITED STATES PATENT OFFICE.

OLOF FRANKMAN, OF MARIEBERG, SWEDEN.

CONVEYER FOR BEET-HARVESTERS AND THE LIKE.

1,205,089.  Specification of Letters Patent.  Patented Nov. 14, 1916.

Application filed March 27, 1916. Serial No. 87,084.

*To all whom it may concern:*

Be it known that I, OLOF FRANKMAN, a citizen of Sweden, and residing at Marieberg, Sweden, have invented a new and useful Improvement in Conveyers for Beet-Harvesters and the like; and I do hereby declare the following to be a full, clear, and exact description of the same.

The invention relates to such conveyers for laying off the leaf-crowns and the beets, that are mounted on beet harvesters and receive the beets and the leaf-crowns from a suitable beet pulling device and a cutting device.

The object of the invention is to provide means for automatically connecting and disconnecting the conveyers at times so as to keep them immovable for receiving the load and then to put them in motion for emptying the load on the side of the machine.

Figure 1:
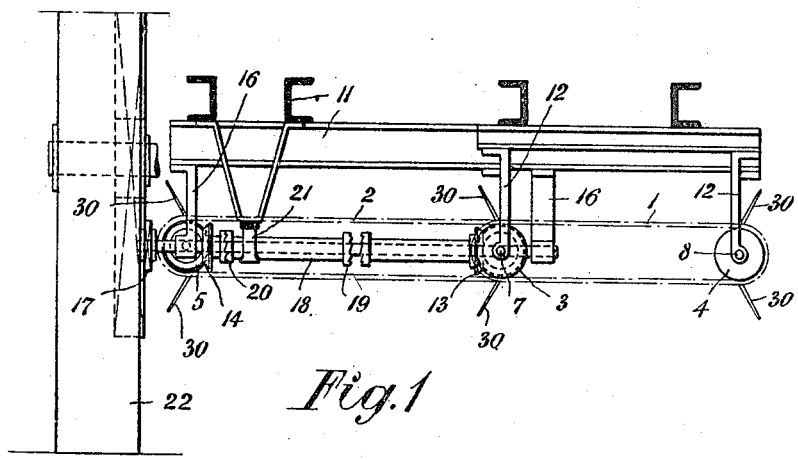
Figure 2:
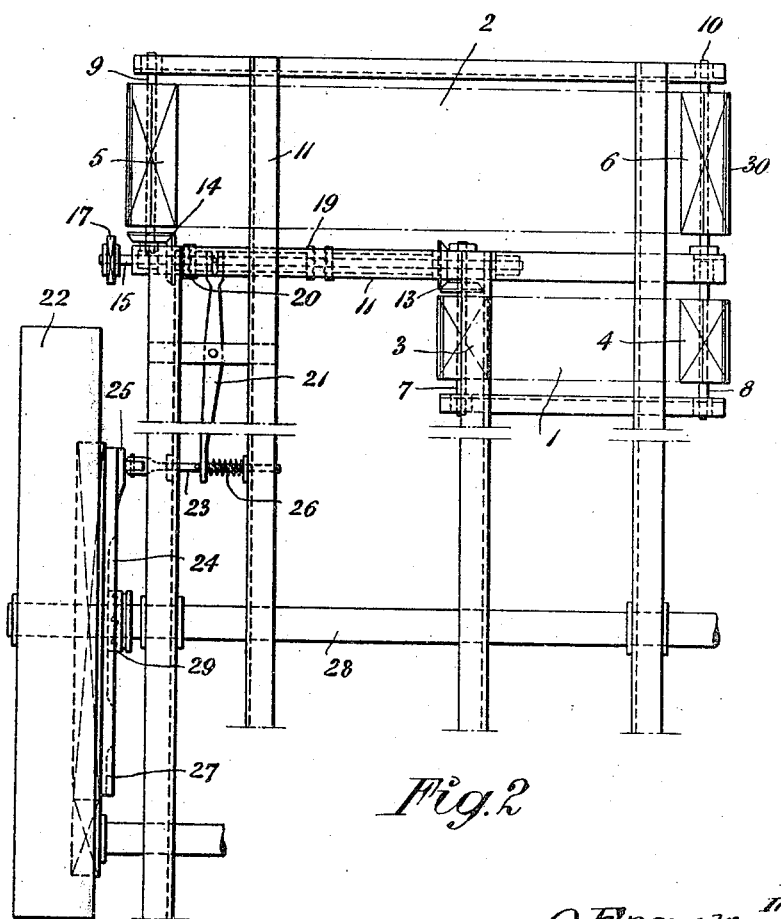

In the accompanying drawings: Figure 1 is a front view of the device and Fig. 2 a plan view of the same applied on a beet harvester provided with means for cutting off the tops and the leaf-crowns of the beets and also with means for pulling the beets out of the ground.

The leaf-crowns are cut off and the beets pulled out by means of machinery not shown in the drawing as not falling under the present invention. This being done the leaf-crowns and the beets are carried upward separately by means of different elevators from which they fall down each on their horizontal conveyer. According to the drawing the beets fall on the conveyer 1 and the leaf-crowns on the conveyer 2. The conveyer belts which may consist of laths or the like run over rollers 3, 4 and 5, 6 mounted on shafts 7, 8 and 9, 10, these shafts being journaled in brackets 12 fastened to the machine frame 11. One of the shafts 7, 9 for each conveyer is a driving shaft and these driving shafts are connected with a continually rotating shaft in such a way that they may be thrown out of gear and thrown into gear on certain moments. In this way the conveyers will be automatically put into motion for emptying the loads of beets and leaf-crowns and then automatically stopped for receiving fresh loads. Thus the beets and the leaf-crowns may be thrown off in different places and for each new row of beets the leaf-crowns and the beets may be thrown off opposite the places where they were laid off from the preceding beet row in such a way that they form rows at right angles to the original beet rows.

The shafts 7 and 9 are for instance by means of the bevel gear systems 13 and 14 connected with an intermediary shaft 15 supported by the journals 16, this shaft 15 being driven from a suitable place of the machine by means of the chain wheel 17 in such a way that it is continually rotating as soon as the machine is working. The shaft 15 is provided with a sleeve 18 rotating with the same and slidable in its longitudinal direction and in both ends provided with clutches 19 and 20 which alternately may be brought in engagement with corresponding clutches connected with the bevel gear wheels 13, 14 by means of a lever 21, the one arm of which is acted upon by a regulating member 23 pressing against a cam or the like 24 fastened on one of the driving wheels 22 of the machine. In the drawing the cam path 24 is provided with an elevation 25 and when the roller in the end of the regulating member 23 passes this elevation the lever 21 throws the conveyer 2 into gear whereat this conveyer travels a distance corresponding to one half of the length of the conveyer belt, *i. e.* a little more than the distance between the shafts 9 and 10. Thus the leaf-crowns gathered on the conveyer belt are laid off and the downward directed part of the belt is turned upward for receiving fresh leaf-crowns to be laid off next time the member 23 passes the elevation 25. The conveyer is thrown out of gear automatically by means of the spring 26 as soon as the elevation is passed. A recess 27 is provided in the cam path 24 opposite the elevation 25. When the regulating member 23 passes this recess the conveyer 1 is thrown into gear and set into motion whereat the beets gathered upon the same are laid off. The cam path 24 may consist of a sheet rotatable around the axle 28 in such a way that it can be locked to the wheel 22 in different positions, for instance by means of a claw-coupling 29. Thus adjusting of the cam path 24 can be easily done at the beginning of each beet row if it is found that the places of laying off do not correspond to the beets and leaf-crowns laid off from the preceding row.

The invention can, of course, also be applied to one single conveyer. In this case the cam path may be provided with only one elevation and one recess. The cam path can also be provided with two elevations and two recesses when it is desired to gather the beets and leaf-crowns in more places.

In order to facilitate the working of the device and to prevent that the beets and leaf-crowns fall outside of the conveyers from the elevators before they are laid off the conveyer belts may be provided with arms or cross walls 30 (Fig. 1) which limit the upper part of the conveyers when the latter are at rest. One of these cross walls or one set of the arms 30 serves also as drivers or pushers at the laying off. Such arms or cross walls may also be arranged in other places of the conveyers in such a way that it is of no account whether the conveyer stops just in the position shown in Fig. 1 of the drawing.

Having thus described my invention, what I claim as new and desire to secure by Letters Patent, is:—

1. In a beet harvester, the combination of a frame, a constantly rotating drive shaft mounted in the frame, a ground wheel on said shaft, an endless conveyer supported on the frame, a clutch for connecting the drive shaft to the conveyer, and a cam on the ground wheel for controlling the clutch.

2. In a beet harvester, the combination of a frame, a constantly rotating drive shaft mounted in the frame, a ground wheel on said shaft, a pair of endless conveyers supported on the frame, means for connecting the drive shaft to the conveyers, and means operated by the ground wheel for alternately operating the shaft connecting means with the respective conveyers.

3. In a beet harvester, the combination of a frame, a constantly rotating shaft supported on the frame, a ground wheel mounted on the shaft, an endless conveyer supported on the frame, and means between the ground wheel and the conveyer for periodically operating the conveyer.

4. In a beet harvester, the combination of a frame, a constantly rotating shaft supported on the frame, an endless conveyer supported on the frame, a clutch shaft adjacent the endless conveyer, a clutch member loosely mounted between the clutch shaft and the endless conveyer, a clutch member slidable on and rotatable with the clutch shaft, a pivoted lever on the frame for sliding the clutch member on the clutch shaft, a cam operated by the ground wheel for periodically operating the lever to cause movement of the endless conveyer.

5. In a beet harvester, the combination of a frame, a constantly rotating shaft mounted on the frame, a ground wheel on said shaft, two endless conveyers supported on the frame, a clutch shaft, two oppositely disposed clutch members located between the clutch shaft and the two endless conveyers, a clutch member slidable on and rotatable with the clutch shaft and adapted to engage at different times the two first mentioned clutch members, a cam operated by the ground wheel, and a connection between the slidable clutch member and the cam to move the respective endless conveyers as the ground wheel rotates.

6. In a beet harvester, the combination of a frame, a constantly rotating shaft mounted on the frame, a ground wheel mounted on the shaft, a pair of endless conveyers supported on the frame, means for operating the pair of endless conveyers, said means comprising a cam having projections and depressions, a lever, clutches, a spring for operating the lever in one direction and coöperating with the cam, and means for adjusting the cam.

7. In a beet harvester, the combination of a frame, a constantly rotating shaft mounted on the frame, a ground wheel supported on the shaft, an endless conveyer extending across the frame, a second and shorter endless conveyer extending partly across the frame, a clutch shaft, gears and clutch members between the clutch shaft and the two conveyers, a clutch member slidable on and rotatable with the clutch shaft and adapted to be connected with the respective first mentioned clutch members, a lever extending from the slidable clutch member, a sliding rod at the end of the lever, a ring cam on the ground wheel, said cam having projections and depressions with which the sliding rod coöperates, and a spring acting on the lever to act with the cam in sliding the clutch member on the clutch shaft.

In testimony whereof, I have signed my name to this specification in the presence of two subscribing witnesses.

OLOF FRANKMAN.

Witnesses:
  H. Branzen,
  Fred Heron.

Copies of this patent may be obtained for five cents each, by addressing the "Commissioner of Patents, Washington, D. C."